United States Patent
Jeong et al.

(10) Patent No.: US 10,139,475 B2
(45) Date of Patent: Nov. 27, 2018

(54) DISTANCE DETECTION APPARATUS FOR ACQUIRING DISTANCE INFORMATION HAVING VARIABLE SPATIAL RESOLUTION AND IMAGE DISPLAY APPARATUS HAVING THE SAME

(71) Applicant: LG ELECTRONICS INC., Seoul (KR)

(72) Inventors: Pil Won Jeong, Seoul (KR); Sang Keun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 271 days.

(21) Appl. No.: 14/912,329

(22) PCT Filed: Aug. 14, 2014

(86) PCT No.: PCT/KR2014/007581
§ 371 (c)(1),
(2) Date: Feb. 16, 2016

(87) PCT Pub. No.: WO2015/023145
PCT Pub. Date: Feb. 19, 2015

(65) Prior Publication Data
US 2016/0187469 A1 Jun. 30, 2016

(30) Foreign Application Priority Data
Aug. 16, 2013 (KR) .................. 10-2013-0097382

(51) Int. Cl.
*G01C 3/08* (2006.01)
*G01S 7/481* (2006.01)
(Continued)

(52) U.S. Cl.
CPC .............. *G01S 7/4817* (2013.01); *G01S 7/51* (2013.01); *G01S 17/023* (2013.01); *G01S 17/08* (2013.01);
(Continued)

(58) Field of Classification Search
CPC ........ G01S 7/4817; G01S 7/51; G01S 17/023; G01S 17/08
(Continued)

(56) References Cited

U.S. PATENT DOCUMENTS 9,267,787 B2 * 2/2016 Shpunt .................. G01B 11/24
9,651,417 B2 * 5/2017 Shpunt .................. G01J 1/0411
(Continued)

FOREIGN PATENT DOCUMENTS

| JP | H05-256645 A | 10/1993 |
|----|--------------|---------|
| JP | H05-312533 A | 11/1993 |
| KR | 10-2007-0002333 A | 1/2007 |

OTHER PUBLICATIONS

International Search Report (with English Translation) and Written Opinion dated Dec. 18, 2014 issued in Application No. PCT/KR2014/007581.

*Primary Examiner* — Mark Hellner
(74) *Attorney, Agent, or Firm* — Ked & Associates, LLP

(57) ABSTRACT

The present invention relates to a distance detection apparatus for acquiring distance information having variable spatial resolution and an image display apparatus having the same. A distance detection apparatus according to an embodiment of the present invention comprises a light source unit for outputting an output light to detect a distance to an external object, a scanner for performing first direction scanning and second direction scanning to output an output light to an external scan area, a light detection unit for receiving an input light from the scan area, and a processor
(Continued)

for detecting a distance to an external object within the external scan area on the basis of the output light and the input light, wherein the processor makes a control to change a frame rate of the scanner and acquires distance information having varied spatial resolution of the external object in accordance with the change in the frame rate. Accordingly, it is possible to acquire distance information having variable spatial resolution on an external object.

15 Claims, 16 Drawing Sheets

(51) Int. Cl.
  *G01S 17/02* (2006.01)
  *G01S 17/36* (2006.01)
  *G01S 17/42* (2006.01)
  *G01S 7/51* (2006.01)
  *G01S 17/08* (2006.01)
  *G01S 17/89* (2006.01)

(52) U.S. Cl.
  CPC .............. *G01S 17/36* (2013.01); *G01S 17/42* (2013.01); *G01S 17/89* (2013.01)

(58) Field of Classification Search
  USPC ........................................................ 356/5.01
  See application file for complete search history.

(56) References Cited

U.S. PATENT DOCUMENTS

| | | |
|---|---|---|
| 2002/0180956 A1 | 12/2002 | Barker |
| 2005/0057741 A1* | 3/2005 | Anderson ............. G01S 7/4814 356/5.01 |
| 2011/0128288 A1 | 6/2011 | Petrou et al. |
| 2011/0310125 A1* | 12/2011 | McEldowney ......... G06F 3/017 345/660 |
| 2013/0207970 A1* | 8/2013 | Shpunt .................... G06T 15/00 345/419 |
| 2017/0205873 A1* | 7/2017 | Shpunt .................... G06F 3/011 |

* cited by examiner

DISTANCE DETECTION APPARATUS FOR ACQUIRING DISTANCE INFORMATION HAVING VARIABLE SPATIAL RESOLUTION AND IMAGE DISPLAY APPARATUS HAVING THE SAME

CROSS-REFERENCE TO RELATED PATENT APPLICATIONS

This application is a U.S. National Stage Application under 35 U.S.C.§ 371 of PCT Application No. PCT/KR2014/007581, filed Aug. 14, 2014, which claims priority to Korean Patent Application No. 10-2013-0097382, filed Aug. 16, 2013, whose entire disclosures are hereby incorporated by reference.

TECHNICAL FIELD

The present invention relates to a distance detection apparatus and an image display apparatus having the same and, more particularly, to a distance detection apparatus for acquiring distance information having variable spatial resolution and an image display apparatus having the same.

BACKGROUND ART

In general, a distance detection apparatus is an apparatus which detects a distance to an external object. In electronic apparatuses, a tendency to detect a distance to an external object and to provide operation according to the detected distance increases.

Therefore, various efforts for miniaturization, weight reduction and precision improvement of distance detection apparatuses are being attempted.

DISCLOSURE

Technical Problem

Therefore, the present invention has been made in view of the above problems, and it is an object of the present invention to provide a distance detection apparatus for acquiring distance information having variable spatial resolution and an image display apparatus having the same.

Technical Solution

In accordance with an aspect of the present invention, the above and other objects can be accomplished by the provision of a distance detection apparatus including a light source unit configured to output light to detect a distance to an external object, a scanner configured to perform scanning in a first direction and scanning in a second direction and to output the output light to an external scan area, a light detection unit configured to receive light from the scan area, and a processor configured to detect the distance to the external object within the external scan area based on the output light and the received light, wherein the processor performs control to vary a frame rate of the scanner and acquires distance information having varied spatial resolution of the external object according to variation of the frame rate of the scanner.

In accordance with another aspect of the present invention, there is provided a distance detection apparatus including a light source unit configured to output light to detect a distance to an external object, a scanner configured to perform scanning in a first direction and scanning in a second direction and to output the output light to an external scan area, a light detection unit configured to receive light from the scan area, and a processor configured to detect the distance to the external object within the external scan area based on the output light and the received light, wherein the processor performs control to vary scanning angles of the scanner and acquires distance information having varied spatial resolution of the external object according to variation of the scanning angles of the scanner.

In accordance with yet another aspect of the present invention, there is provided an image display apparatus including a display and a distance detection unit, wherein the distance detection unit includes a light source unit configured to output light to detect a distance to an external object, a scanner configured to perform scanning in a first direction and scanning in a second direction and to output the output light to an external scan area, a light detection unit configured to receive light from the scan area, and a processor configured to detect the distance to the external object within the external scan area based on the output light and the received light, wherein the processor performs control to vary at least one of a frame rate and scanning angles of the scanner and acquires distance information having varied spatial resolution of the external object according to variation of the at least one of the frame rate and the scanning angles.

Advantageous Effects

A distance detection apparatus in accordance with one embodiment of the present invention outputs light from a scanner to an external scan area, receives light corresponding to the output light, and detects a distance to an external object based on the output light and the received light. Here, spatial resolution in detection of the distance to the external object may be varied by varying the frame rate of the scanner. Particularly, distance information of the external object having increased spatial resolution may be acquired by decreasing the frame rate of the scanner.

Further, a distance detection apparatus in accordance with another embodiment of the present invention outputs light from a scanner to an external scan area, receives light corresponding to the output light, and detects a distance to an external object based on the output light and the received light. Here, spatial resolution in detection of the distance to the external object may be varied by varying the scanning angles of the scanner. Particularly, distance information of the external object having increased spatial resolution may be acquired by decreasing the scanning angles of the scanner.

Further, an image display apparatus in accordance with one embodiment of the present invention acquires distance information of an external object having varied spatial resolution corresponding to variation of at least one of a frame rate and scanning angles.

Further, at least one of the frame rate and scanning angles of a distance detection unit may be varied according to user selection input and, thus, user convenience may be increased.

Moreover, touch input is sensed through a touch sensor unit and, if a user finger is separated from the touch sensor unit, the distance detection unit is activated and may thus perform detection of a distance to the user finger.

DESCRIPTION OF DRAWINGS

The above and other objects, features and other advantages of the present invention will be more clearly understood from the following detailed description taken in conjunction with the accompanying drawings, in which.

BEST MODE

The advantages and features of the present invention, and the way of attaining them, will become apparent with reference to embodiments described below in conjunction with the accompanying drawings.

The suffixes "module" and "unit" in elements used in description below are only given in consideration of ease in preparation of the specification and do not have specific meanings or functions. Therefore, the suffixes "module" and "unit" may be used interchangeably.

A distance detection apparatus described in the specification may output light to an external object, receive light from the external object, and execute distance detection based on the output light and the received light, by a scanning method.

Particularly, when a distance to an external object is detected, spatial resolution may be varied by varying a frame rate of a scanner or varying scanning.

For this purpose, the distance detection apparatus uses time of light (TOF) using the scanning method.

Such a distance detection apparatus may be employed by home appliances, such as a mobile terminal, a TV, a set-top box, a media player, a game machine, an air conditioner, a refrigerator, a washing machine, a cooking appliance, a robot cleaner, etc., and be employed by vehicles.

Hereinafter, the distance detection apparatus will be described in detail.

Figure 1:
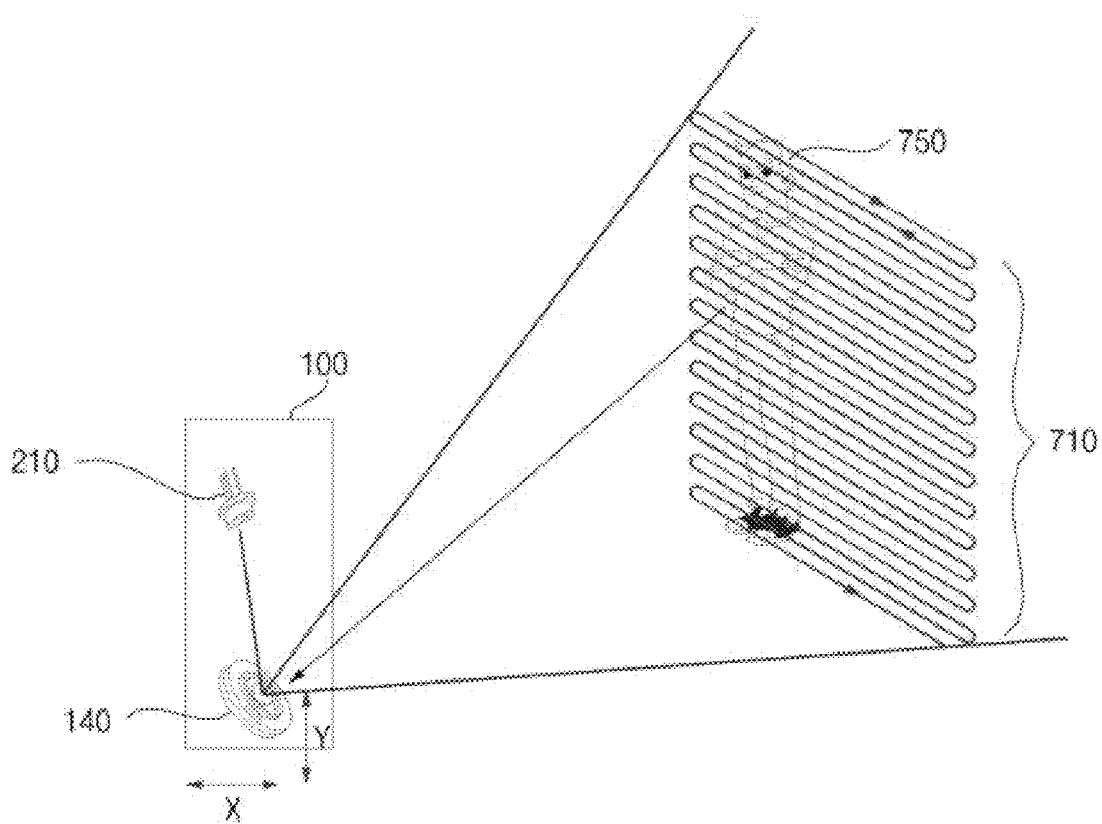
FIG. 1 is a view illustrating output of light for distance detection from a distance detection apparatus in accordance with one embodiment of the present invention.

FIG. 1 is a view illustrating output of light for distance detection from a distance detection apparatus in accordance with one embodiment of the present invention.

With reference to FIG. 1, a distance detection apparatus 100 may include a scanner 140 to output light for distance detection to external object to the outside through scanning in a first direction and scanning in a second direction.

The scanner 140 may output infrared light while performing sequential scanning of a scan area 710 at a designated frame rate.

This figure exemplarily illustrates an external object 750 as being located within the scan area 710 and the distance detection apparatus 100 may receive light scattered or reflected by the external object 750. Further, the distance detection apparatus 100 may detect a distance to the scan area 710 including the external object 750 based on the output light and the received light.

The scanner 140 is an MEMS scanner which is driven at a designated frame rate, a designated scanning angle in the x-axis direction and a designated scanning angle in the y-axis direction.

As a distance from the distance detection apparatus 100 to an external object increases, the dimensions of the scan area 710 increase. Consequently, as a distance from the distance detection apparatus 100 to an external object increases, spatial resolution of distance information of the external object acquired per unit area decreases.

In the present invention, in order to solve such problems, a method for acquiring distance information having improved spatial resolution per unit area is proposed.

In the present invention, as a method for acquiring distance information having improved spatial resolution per unit area during scanning, a method for varying a frame rate of the scanner 140 or varying scanning angles of the scanner 140 is proposed. These methods will be described in detail with reference to FIG. 6a and subsequent figures.

Figure 2:
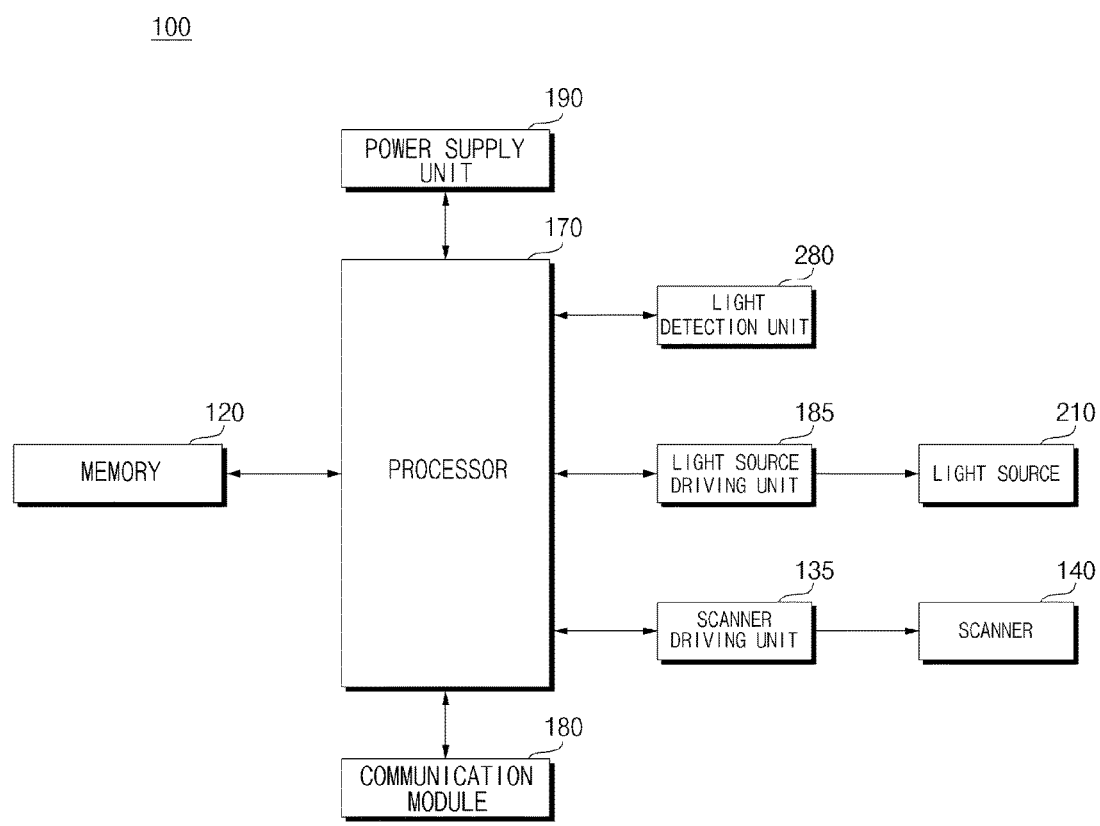
FIG. 2 is one exemplary inner block diagram schematically illustrating the distance detection apparatus of FIG. 1.

FIG. 2 is one exemplary inner block diagram schematically illustrating the distance detection apparatus of FIG. 1.

With reference to FIG. 2, the distance detection apparatus 100 outputs light through a time of flight (TOF) method.

For this purpose, the distance detection apparatus 100 may include a memory 120, a scanner driving unit 135, the scanner 140, a processor 170, a communication module 180, a light source driving unit 185, a power supply unit 190, a light source unit 210, a light detection unit 280, etc.

The memory 120 may store programs for processing and controlling the processor 170 and execute a function of temporarily storing input or output data (for example, a still image, a moving picture, etc.).

The communication module 180 serves as an interface with all external apparatuses connected to the distance detection apparatus 100 by wire or wirelessly. The communication module 180 may receive data or power from the external apparatuses and transmit the data or power to all elements of the distance detection apparatus 100, and transmit data of the inside of the distance detection apparatus 100 to the external apparatuses.

The scanner driving unit 135 drives the scanner 140. Particularly, the scanner driving unit 135 may adjust a scanning angle of the scanner 140 in the first direction and a scanning angle of the scanner 140 in the second direction.

The scanner driving unit 135 may set the scanning angle of the scanner 140 in the first direction to x and set the scanning angle of the scanner 140 in the second direction to y, in a first scanning mode. As one example, x may be 50 degrees and y may be 30 degrees.

As another example, the scanner driving unit 135 may set the scanning angle of the scanner 140 in the first direction to x/10 and set the scanning angle of the scanner 140 in the second direction to y/10, in a second scanning mode. For example, x/10 may be 5 degrees and y/10 may be 3 degrees.

That is, the second scanning mode may be executed if precise scanning is performed, as compared to the first scanning mode.

The first scanning mode may be referred to as an overall scanning mode and the second scanning mode may be referred to as a scanning zoom mode.

That is, if a region is selected automatically or by user input after the overall scanning mode has been executed, the scanning zoom mode of an important region or the selected region may be executed.

The scanner driving unit 135 may control the scanner 140 to vary a frame rate.

For example, the scanner driving unit 135 may control the scanner 40 to execute scanning of a first region at a first frame rate and then to execute scanning of a second region at a second frame rate lower than the first frame rate.

In more detail, when scanning is executed at the second frame rate (A/2) lower than the first frame rate (A), spatial resolution is doubled during scanning and, thus, distance information having doubled spatial resolution per unit area may be acquired.

Such a frame rate may be varied by user input, etc.

The scanner driving unit 135 may simultaneously adjust a frame rate and scanning angles. That is, the scanner driving unit 135 may adjust both the frame rate and the scanning angles by user input, etc.

The scanner 140 may sequentially and repeatedly execute scanning in the first direction and scanning in the second direction using input light, and then output light.

Light input to the scanner 140 may include output light for detecting a distance to an external object. Here, output light may be infrared light.

The scanner 140 may execute scanning of the entirety of an external scan area per frame by sequentially and repeatedly executing scanning from left to right and scanning from right to left with respect to the scan area. Further, the scanner 140 may output light to the external scan area by such scanning.

The processor 170 may control the overall operation of the distance detection apparatus 100. Concretely, the processor 170 may control operations of the respective units of the distance detection apparatus 100.

In order to detect a distance to an external object, the processor 170 may transmit an electrical signal corresponding to output light to the light source driving unit 185.

The processor 170 may control operation of the scanner 140. Concretely, the processor 170 may control the scanner 140 to output light to the outside by sequentially and repeatedly performing scanning in the first direction and scanning in the second direction.

The processor 170 may execute detection of a distance to an external object based on an electrical signal corresponding to output light transmitted to the light source driving unit 185 and an electrical signal corresponding to light received by the light detection unit 280.

For example, the processor 170 may detect a distance to the external scan area 700 using a phase difference between the electrical signal corresponding to the output light and the electrical signal corresponding to the received light. Further, the processor 170 may detect a user gesture motion based on distance information of the external scan area detected per frame.

Further, the light source unit 210 may include an infrared light source unit to output infrared light.

The light detection unit 280 may convert light, received from the outside in response to the output light, into an electrical signal. For this purpose, the light detection unit 280 may include a photodiode to convert an optical signal into a received signal, i.e., an electrical signal. Particularly, the light detection unit 280 may include am avalanche photodiode which is a photodiode having high photoelectric efficiency to convert received light scattered by an external object into an electrical signal.

If the output light is infrared light, the light detection unit 280 may include a charge coupled device (CCD) or a CMOS sensor to receive the infrared light.

Although not shown in the drawings, a sampler (not shown) to convert an analog signal into a digital signal may be further provided between the light detection unit 280 and the processor 170.

The light source driving unit 185 may control the infrared light source in the light source driving unit 185 to output infrared light in response to an electrical signal corresponding to output light received from the processor 170.

The power supply unit 190 may receive external power or internal power and supply power necessary for operations of the respective elements under the control of the processor 170.

Figure 3:
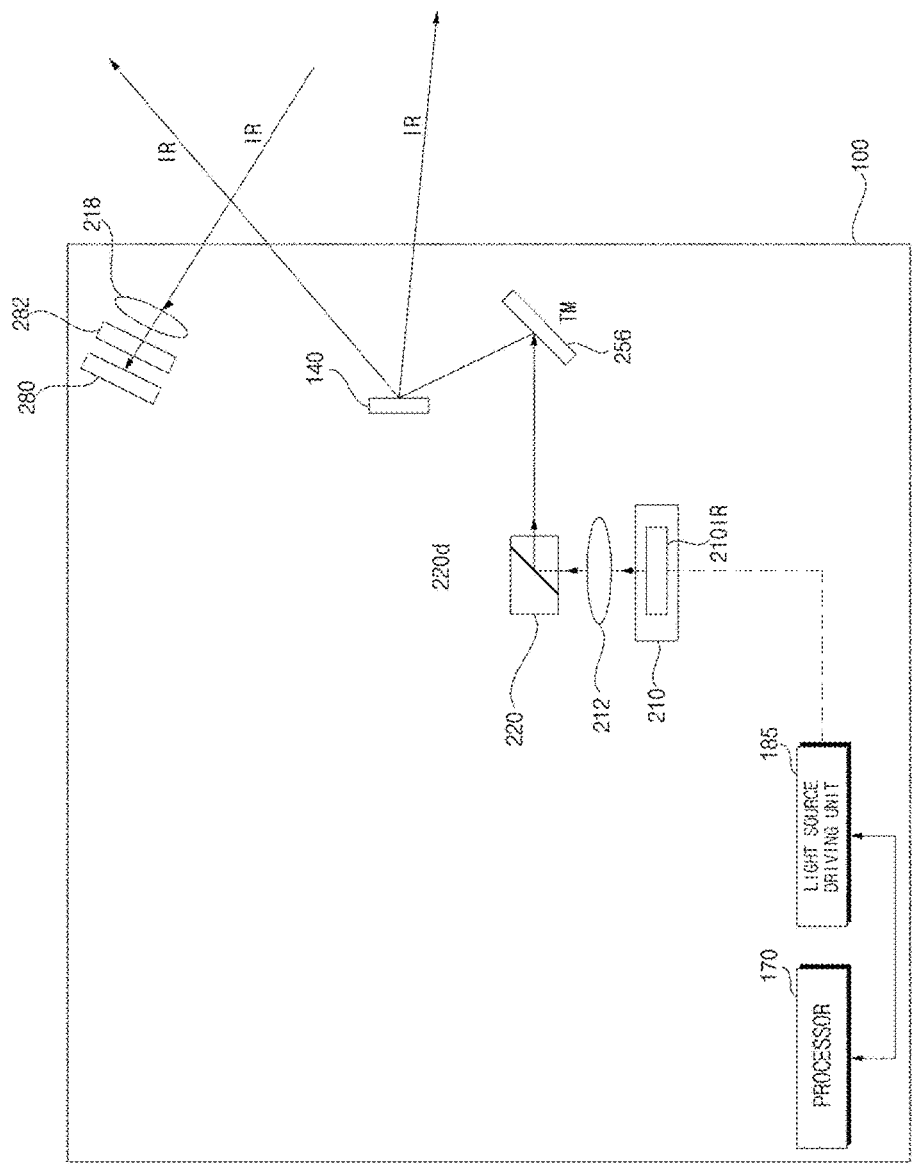
FIG. 3 is one exemplary view illustrating the structure of the distance detection apparatus of FIG. 1.

FIG. 3 is one exemplary view illustrating the structure of the distance detection apparatus of FIG. 1.

The distance detection apparatus of FIG. 3 may include the light source unit 210, a light collimating unit 212, a first light reflection unit 220, a second light reflection unit 256, the scanner 140, the processor 170, the light source driving unit 185, a light collimating unit 218, an infrared transmission filter 282 and the light detection unit 280.

The light source unit 210 may include an output light source unit 210IR to output infrared light. The output light source unit 210IR may include a laser diode or an LED.

The output light source unit 210IR may be driven by an electrical signal from the light source driving unit 185, and the electrical signal from the light source driving unit 185 may be generated under the control of the processor 170. Thereby, the output light source unit 210IR may output infrared light.

The light output from the output light source unit 210IR is incident upon the scanner 140 via the light collimating unit 213, the first light reflection unit 220 and the second light reflection unit 256.

The light collimating unit 210 collimates light output from the light source unit 210. For this purpose, the light collimating unit 210 may include a collimating lens to collimate output light.

The first light reflection unit 220 and the second light reflection unit 256 may include a total mirror (TM).

Further, the scanner 140 outputs light to the external scan area through scanning. In the external scan area, the output light (IR) may be scattered or reflected and be incident upon and received by the distance detection apparatus 100. Concretely, the received light may be input to the light detection unit 280 via the light collimating unit 218 and the infrared transmission filter 282.

The light detection unit 280 may convert the received light into an electrical signal, and the processor 170 may execute distance detection based on the received light and the output light.

Figure 4:
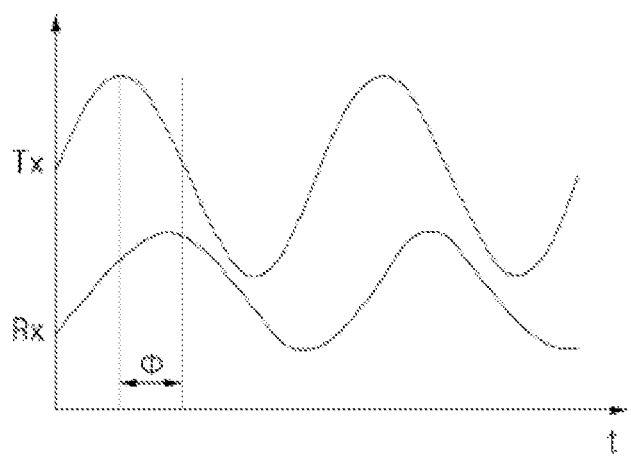
FIG. 4 is a reference view illustrating a distance detection method using the distance detection apparatus of FIG. 3.

FIG. 4 is a reference view illustrating a distance detection method using the distance detection apparatus of FIG. 3. Here, Tx indicates a phase signal of output light and Rx indicates a phase signal of received light.

With reference to the figures, the processor 170 of the distance detection apparatus 100 may calculate a distance information level according to a phase difference (Φ) between the phase signal of the output light and the phase signal of the received light.

For example, as the phase difference increases, an external object is located at a position distant from the distance detection apparatus 100 and thus the distance information level may be set to be large and, as the phase difference decreases, an external object is located at a position close to the distance detection apparatus 100 and thus the distance information level may be set to be small.

Such setting of the distance level is performed according to respective regions of the external scan area 710 while scanning the external scan area 710 horizontally and vertically, as described above. Further, the distance information level may be detected according to the respective regions of the external scan area 710.

Figure 5:
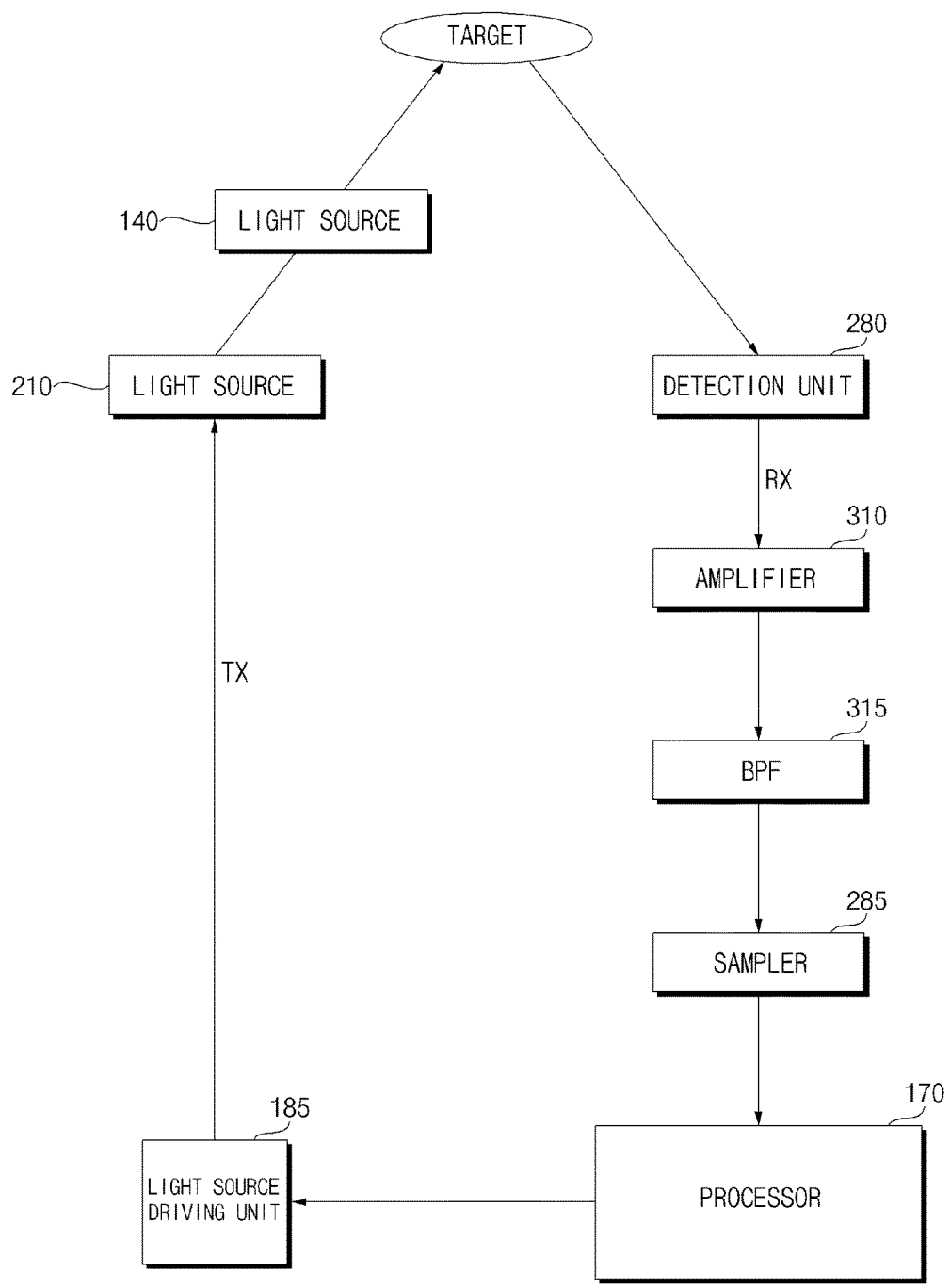
FIG. 5 is another exemplary inner block diagram illustrating the distance detection apparatus of FIG. 1.

FIG. 5 is another exemplary inner block diagram illustrating the distance detection apparatus of FIG. 1.

The distance detection apparatus 100 may include a processor 170, a light source driving unit 185, a light source unit 210, a scanner 140, a light detection unit 280, an amplifier 310, a filter unit 315, and a sampler 285.

The processor 170 may control the light source driving unit 185 to output an electrical signal (Tx) for outputting light to the light source unit 210. Thereby, the light source unit 210 outputs light.

The scanner 140 receives the output light and outputs the light to an external scan area by scanning in a first direction and scanning in a second direction. Particularly, the scanner 140 outputs light to an external object 40.

The light detection unit 280 receives light scattered or reflected by the external object 40 and converts the received light into an electrical signal (Rx).

The amplifier 310 amplifies the electrical signal (Rx) corresponding to the received light, and the filter unit 315 executes band pass filtering with a designated bandwidth. Further, the sampler 285 executes sampling of the filtered signal.

The processor detects a distance to the external object 40 based on the input sampled signal.

FIGS. 6a to 7b are views illustrating one example of a method for varying spatial resolution in distance detection in accordance with one embodiment of the present invention.

Figure 6A:
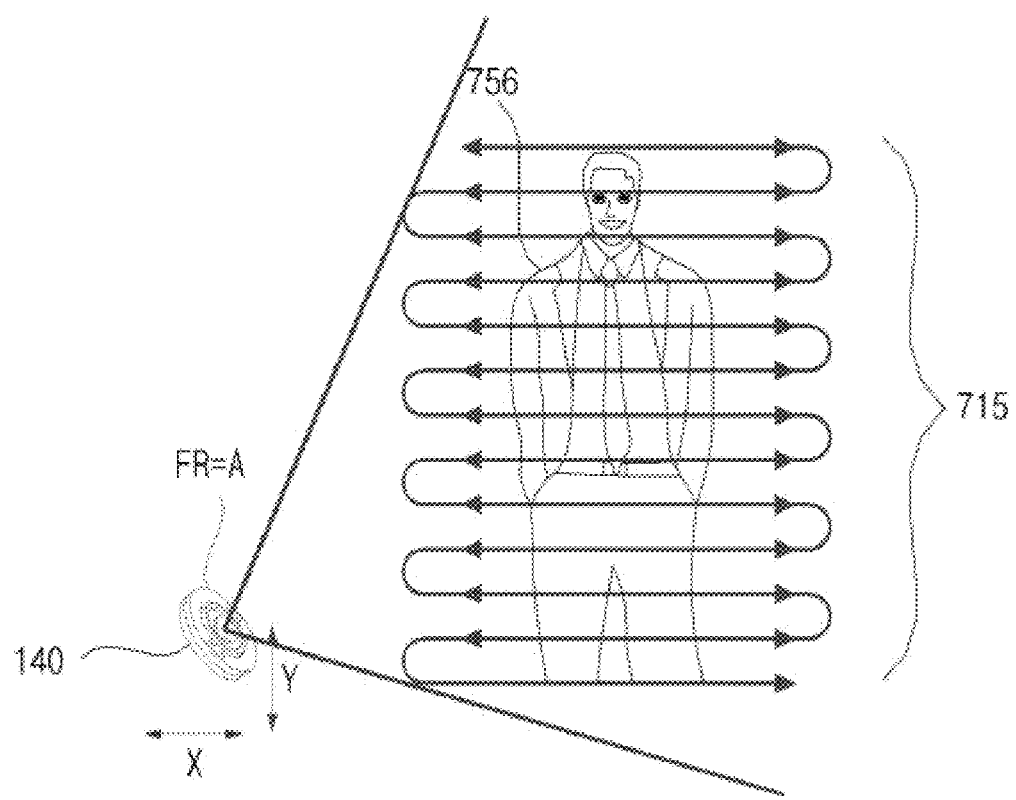
FIGS. 6a to 7b are views illustrating one example of a method for varying spatial resolution in distance detection in accordance with one embodiment of the present invention.

First, FIG. 6a exemplarily illustrates the scanner 140 as executing scanning of an external scan area 715 at a first frame rate A, a first scanning angle X and a second scanning angle Y. Thereby, an external object 756 is scanned while light is output.

Figure 6B:
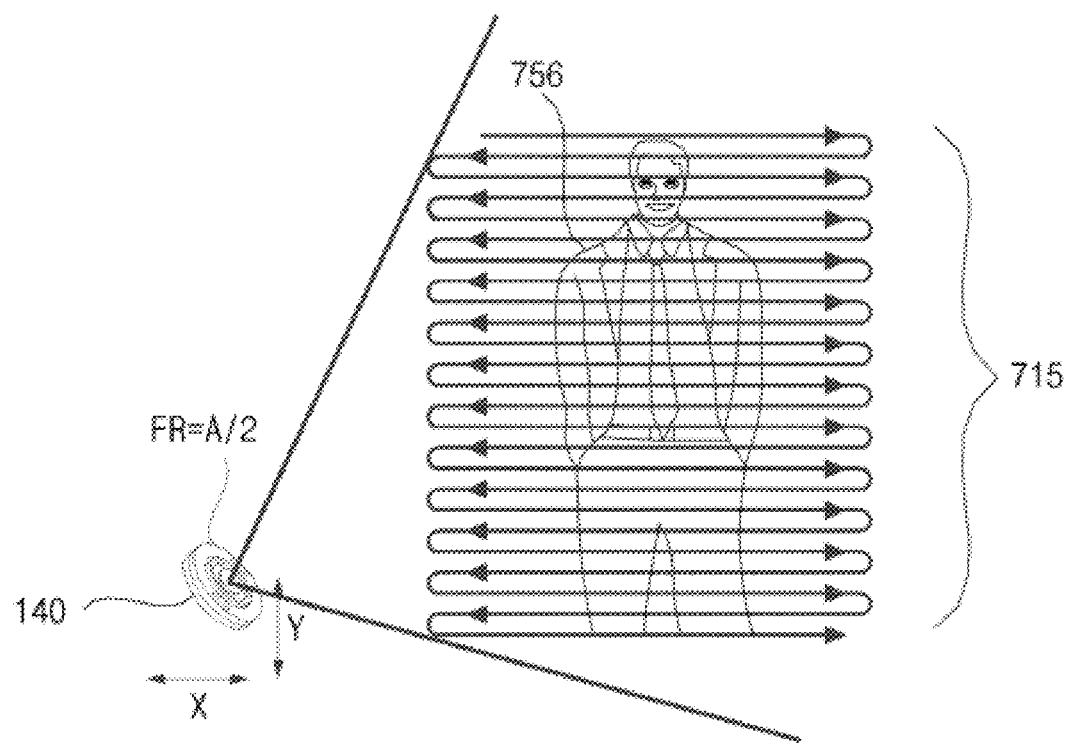

Next, FIG. 6b exemplarily illustrates a method for increasing spatial resolution during scanning of the external object 756.

This figure exemplarily illustrates the scanner 140 as executing scanning at a second frame rate A/2 lower than the first frame rate A. Here, the first scanning angle X and the second scanning angle Y are maintained. In this case, spatial resolution during scanning is doubled, as compared to the spatial resolution in FIG. 6a.

For example, if the frame rate is lowered from 60 Hz in FIGS. 6a to 30 Hz, the scanning speed of the scanner 140 is constant and, thus, the number of times of scanning per unit area of the scan area 715 is increased. That is, as exemplarily shown in FIG. 6b, scanning is executed with doubled spatial resolution with respect to horizontal lines.

Thereby, more precise distance information of the external object 756 may be acquired. That is, distance information having doubled spatial resolution per unit area may be acquired.

In order to acquire more precise distance information of the external object 756, a bandwidth of the filter unit 315 and a sampling rate of the sampler 285 may be varied, in addition to the frame rate.

For example, during scanning of one line of the scan area 715, in order to increase horizontal resolution, the bandwidth of the filter unit 315 may be increased and the sampling rate of the sampler 285 may be increased.

By varying the bandwidth and the sampling rate, horizontal resolution during scanning may be increased. Further, by varying the frame rate, as described above, vertical resolution during scanning may be increased.

Accordingly, in order to acquire distance information having improved spatial resolution, the frame rate may be lowered, the bandwidth of the filter unit 315 and the sampling rate of the sampler 285 may be increased, or combination thereof may be performed.

The processor 170 may perform control to vary the frame rate based on user input. Further, the scanner driving unit 135 may control the scanner 140 to vary the frame rate under the control of the processor 170.

Otherwise, if movement of the external object 756 is sensed, the processor 170 may perform control to lower the frame rate for more precise distance detection. That is, as exemplarily shown in FIG. 6b, the processor 170 may control the frame rate to be A/2. Further, the scanner driving unit 135 may lower the frame rate of the scanner 140 under the control of the processor 170.

Figure 7A:
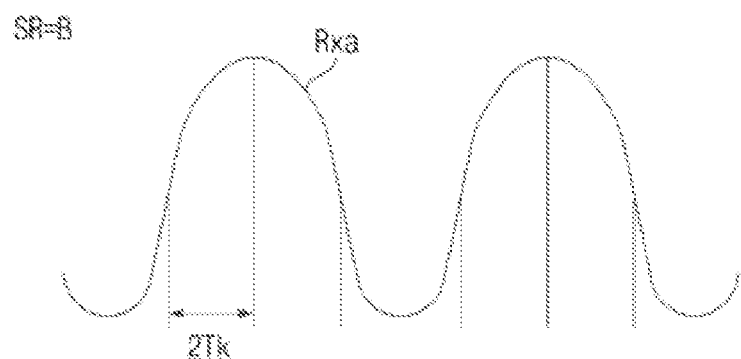
Figure 7B:
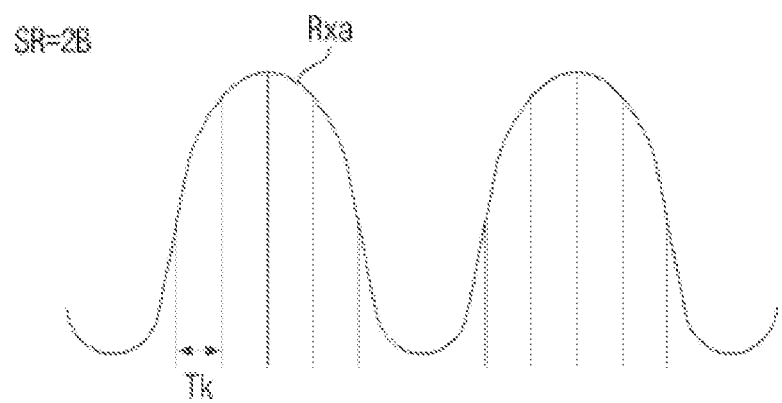

FIG. 7a exemplarily illustrates a first sampling rate B of the sampler 285 and FIG. 7b exemplarily illustrates a second sampling rate 2B of the sampler 285. A sampling interval Tk of FIG. 7b is 0.5 times a sampling interval 2Tk of FIG. 7a and thereby, it may be understood that the sampling rate of FIG. 7b is 2 times that sampling rate of FIG. 7a.

The processor 170 may receive such data and execute detection of more precise distance information having increased spatial resolution, i.e., horizontal resolution.

Figure 8A:
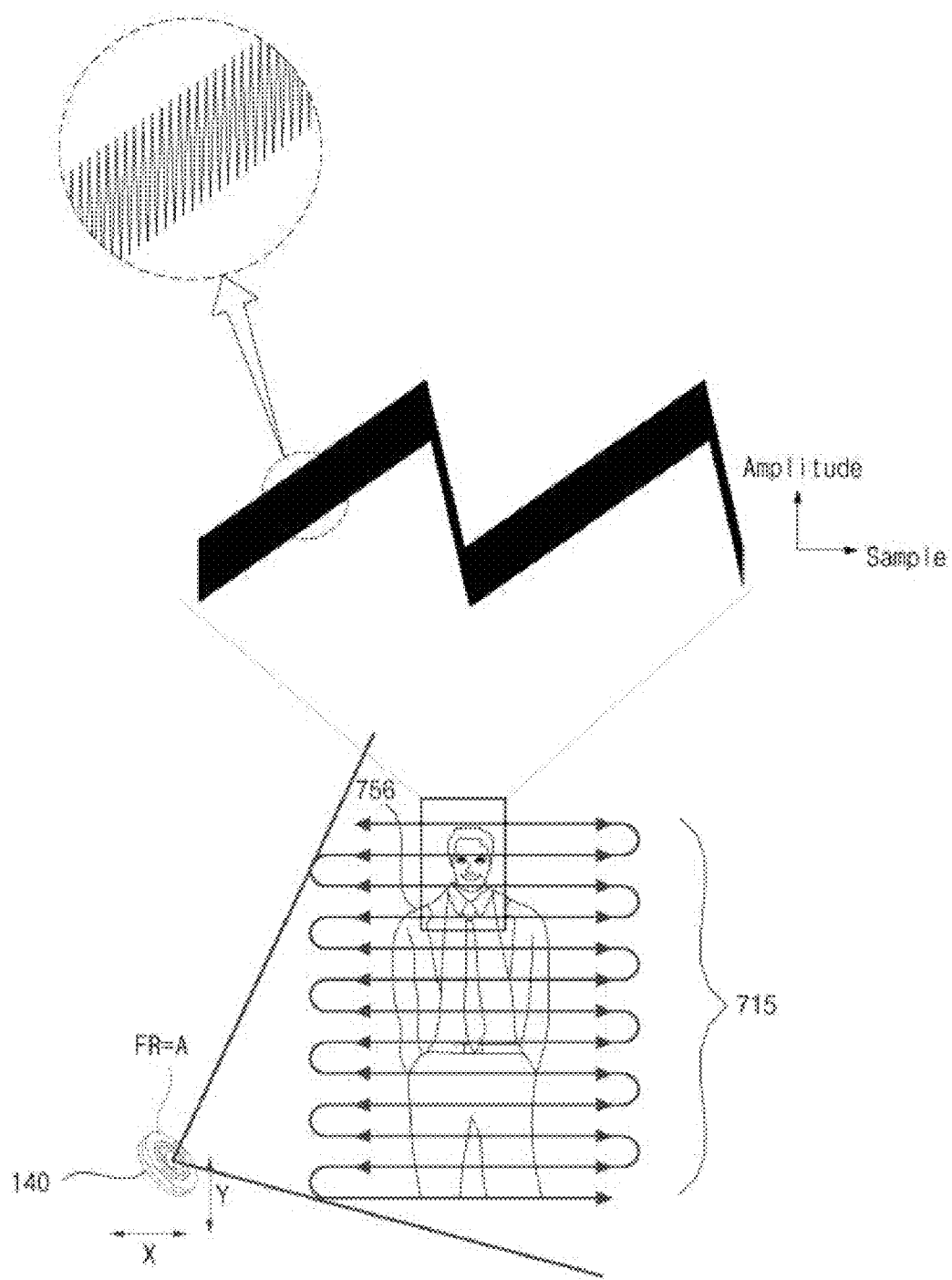
FIGS. 8a to 8c are views illustrating one example of a method for varying spatial resolution in distance detection in accordance with another embodiment of the present invention.
Figure 8B:
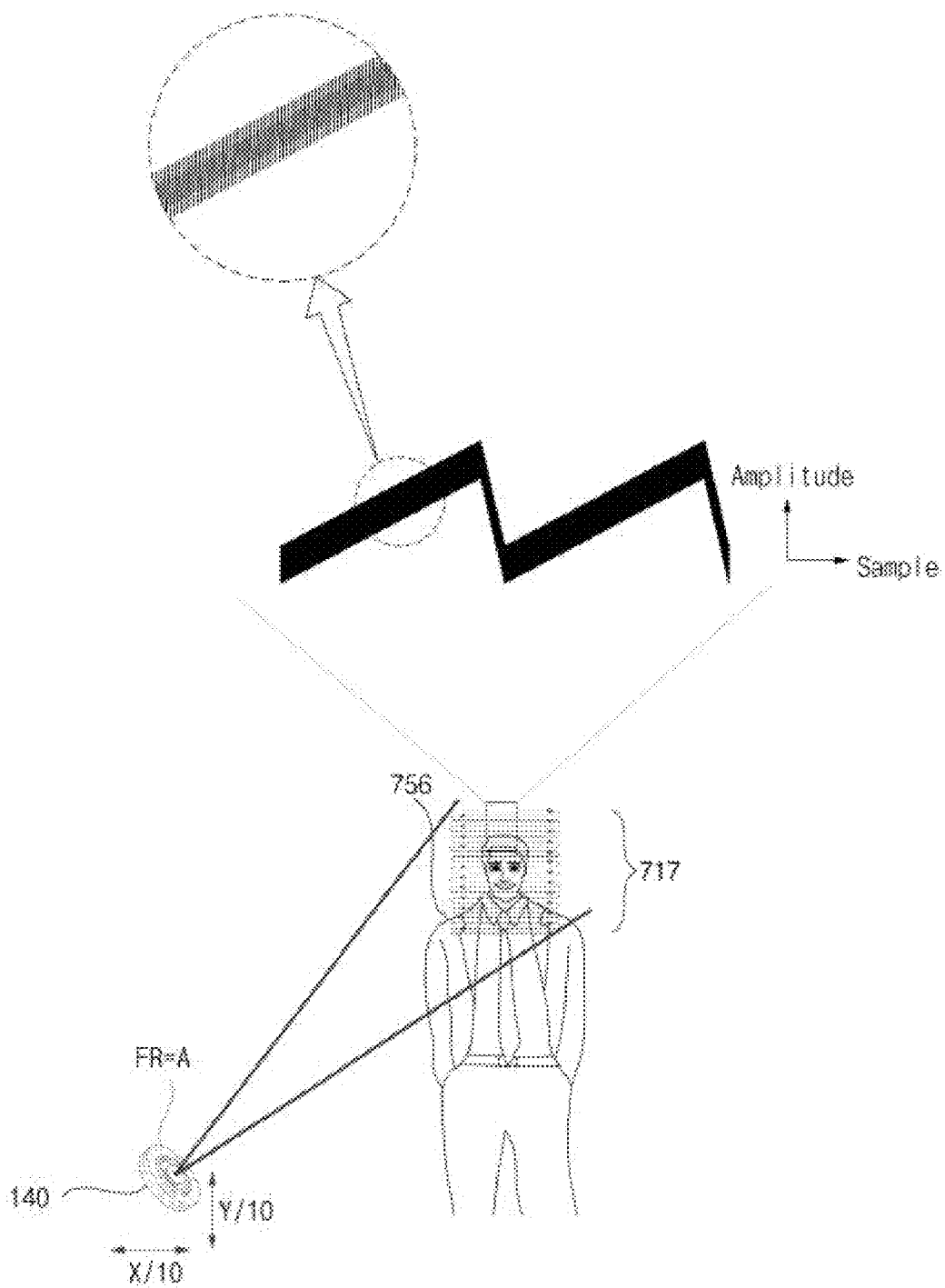

FIGS. 8a and 8b are views illustrating one example of a method for varying spatial resolution in distance detection in accordance with another embodiment of the present invention.

First, the method of FIGS. 8a and 8b differs from the method of FIGS. 6a and 6b in that a frame rate is not varied and scanning angles are varied.

In the same manner as in FIG. 6a, FIG. 8a exemplarily illustrates the scanner 140 as executing scanning of an external scan area 715 at a first frame rate A, a first scanning angle X and a second scanning angle Y. For example, x may be 50 degrees and y may be 30 degrees. Thereby, an external object 756 is scanned while light is output.

This figure exemplarily illustrates a first scanning driving signal Scan1 input to the scanner 140 for the first scanning mode. It may be understood that the amplitude of the scanning driving signal is repeated at a designated time interval.

Next, FIG. 8b exemplarily illustrates a method for increasing spatial resolution during scanning of the external object 756.

This figure exemplarily illustrates that the first scanning angle and the second scanning angle are respectively decreased to X/10 and Y/10, as compared to FIG. 8a. For example, x/10 may be 5 degrees and y/10 may be 3 degrees. Here, the frame rate A may be maintained.

This figure exemplarily illustrates a second scanning driving signal Scan2 input to the scanner 140 for the second scanning mode. It may be understood that the amplitude of the scanning driving signal is repeated at a designated time interval. The amplitude of the second scanning driving signal Scan 2 is lower than the amplitude of the first scanning driving signal Scan 1 and, thereby, the scanning angles are decreased.

Further, a scan area 717 of FIG. 8*b* during scanning is reduced to ¹⁄₁₀₀ that of FIG. 8*a*. Thereby, only a part 717 of the overall scan area 715 of FIG. 8*a* may be scanned.

By such a method, the frame rate is constant but the scanning angles are reduced and, thus, scanning spatial resolution per unit area in the partial scan area 717 is increased to about 100 times.

Thereby, more precise distance information of the external object 756 may be acquired. That is, distance information having spatial resolution per unit area improved to 100 times may be acquired.

Such adjustment of the scan area by adjusting the scanning angles may be referred to as scanning zoom.

On the other hand, if the scanning angles are adjusted, as exemplarily shown in FIG. 8*b*, scanning spatial resolution per unit area in the partial area 717 is increased but the amount of data to be processed per frame may be maintained.

The processor 170 may execute more precise distance detection having increased spatial resolution by receiving scanning zoom data of the specific region 717.

Further, in the case of FIG. 8*b*, a bandwidth of the filter unit 315 and a sampling rate of the sampler 285 may be increased, in the same manner as in FIG. 7*b*.

Accordingly, in order to acquire distance information having improved spatial resolution of a specific region, the frame rate may be adjusted, the bandwidth of the filter unit 315 and the sampling rate of the sampler 285 may be increased, or combination thereof may be performed.

Although FIGS. 8*a* and 8*b* exemplarily illustrate the method in which spatial resolution is increased by decreasing the first scanning angle and the second scanning angle of the scanner 140 and maintaining the frame rate, various modifications of the method are possible.

For example, only the first scanning angle of the scanner 140 may be decreased or only the second scanning angle of the scanner 140 may be decreased. In more detail, in order to execute scanning of only the external object 756 out of the scan area 715 of FIG. 8*a*, the first scanning angle and the second scanning angle may be set to X/2 and Y. Further, the frame rate may be maintained. In this case, distance information having doubled spatial resolution may be acquired.

The processor 170 may perform control to execute scanning zoom through adjustment of the scanning angles, after detection of the position of the external object through calculation for distance detection as to the overall scan area.

Further, the processor 170 may perform control to vary the scanning angles based on user input. Further, the scanner driving unit 135 may control the scanner 140 to vary the scanning angles under the control of the processor 170.

Otherwise, if movement of the external object (for example, a user hand) is sensed, the processor 170 may perform control to lower the scanning angles for more precise distance detection. That is, as exemplarily shown in FIG. 8*b*, the processor 170 may control the scanning angles to be set to respectively x/10 and y/10. Further, the scanner driving unit 135 may lower the scanning angles under the control of the processor 170.

Figure 8C:
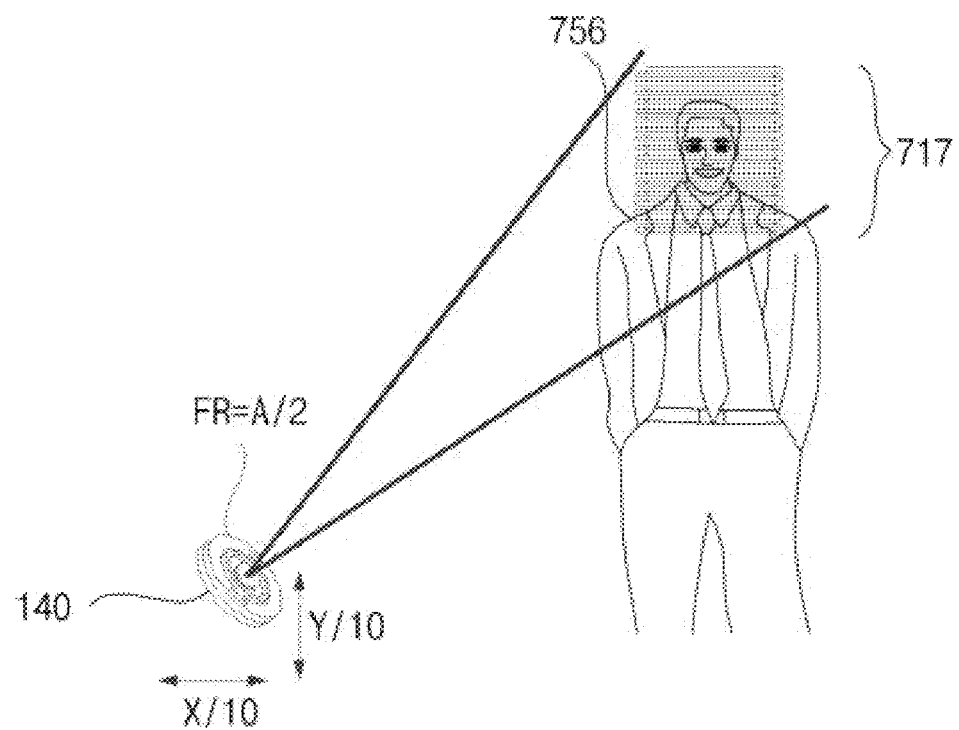

Next, FIG. 8*c* exemplarily illustrates a method for varying both scanning angles and a frame rate during scanning of an external object 756.

This figure exemplarily illustrates that the first scanning angle and the second scanning angle of the scanner 140 are respectively decreased to X/100 and Y/100, as compared to FIG. 8*a*. Further, this figure exemplarily illustrates that the frame rate is lowered to A/2.

For example, if the first scanning angle and the second scanning angle are respectively set to X/10 and Y/10 and the frame rate is lowered from 60 Hz to 30 Hz, distance information having increased spatial resolution, i.e., 10*10*2=200 times that of FIG. 8*a*, may be acquired.

The processor 170 may execute scanning zoom through adjustment of the scanning angles, after detection of the position of the external object through calculation for distance detection as to the overall scan area.

Further, the processor 170 may perform control to vary the scanning angles and the frame rate based on user input. Further, the scanner driving unit 135 may control the scanner 140 to vary the scanning angles and the frame rate under the control of the processor 170.

Otherwise, if movement of the external object (for example, a user hand) is sensed, the processor 170 may perform control to decrease the scanning angles and the frame rate for more precise distance detection. That is, as exemplarily shown in FIG. 8*c*, the processor 170 may control the scanning angles to be respectively set to x/10 and y/10 and control the frame rate to be set to A/2. Further, the scanner driving unit 135 may decrease the scanning angles and the frame rate under the control of the processor 170.

Figure 9:
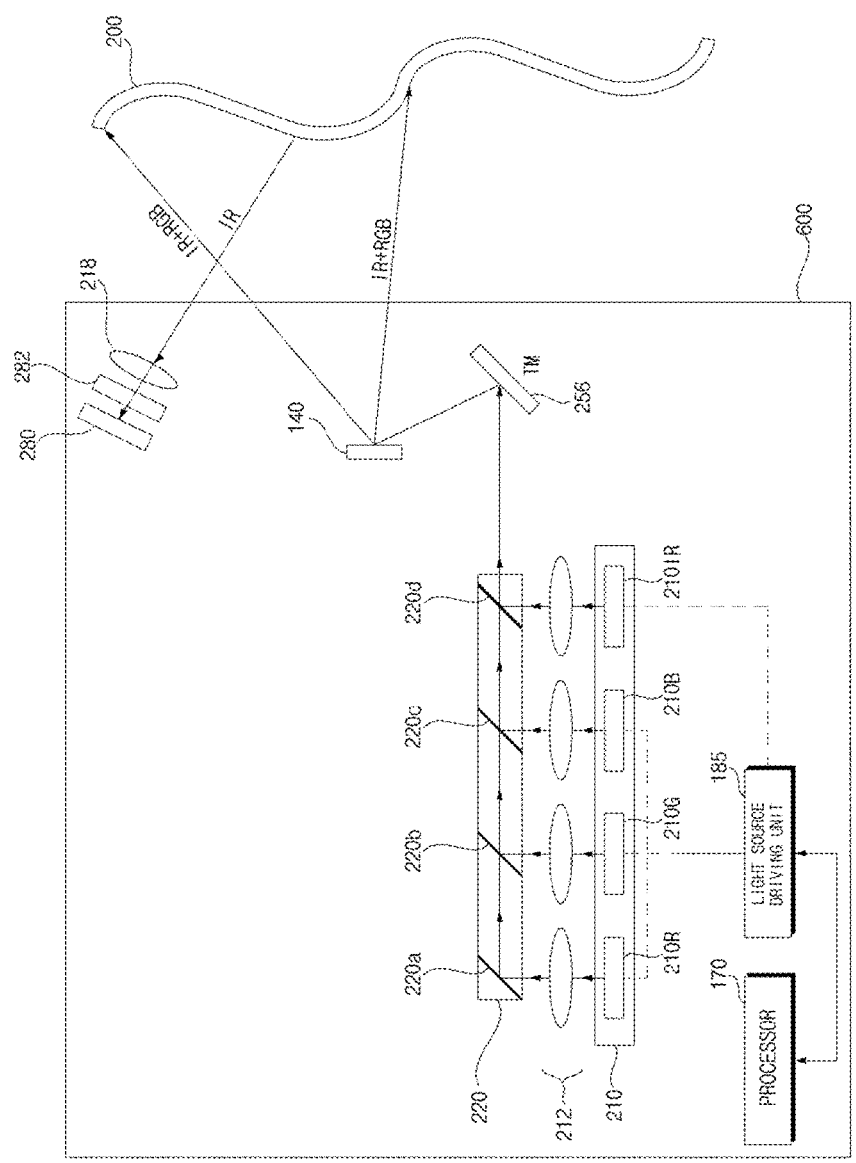
FIG. 9 is one exemplary view illustrating the structure of a display apparatus in accordance with another embodiment of the present invention.

FIG. 9 is one exemplary view illustrating the structure of a display apparatus in accordance with another embodiment of the present invention.

With reference to this figure, a display apparatus 30 of FIG. 9 may include a light output module 600 and a screen 200.

The light output module 600 of FIG. 9 outputs light similarly to the distance detection apparatus 100 of FIG. 1, but differs from the distance detection apparatus 100 in that the light output module 600 further outputs a projected image based on visible light.

That is, the light output module 600 may output light for detection of a distance to an external object to the outside by scanning in the first direction and scanning in the second direction, receive light corresponding to the output light, and detect a distance to the external object or movement of the external object based on the output light and the received light.

Further, the light output module 600 may output a projected image based on visible light to the outside together with the output light by scanning in the first direction and scanning in the second direction.

For this purpose, the light output module 600 may include a 2D scanner 140 which may simultaneously output the projected image and the output light by the scanning method.

Since a user located at a side of the screen 200 opposite the light output module 600 recognizes an image projected on the screen 200, such a method may be referred to as a rear projection method.

A distance to the user located at the side of the screen 200 opposite the light output module 600 may be detected based on light output in the direction of the screen 200.

As one example, if the user located in front of the screen 200 performs touch input of touching the screen 200 using a finger, the light output module 600 may receive light scattered or reflected by the user finger and sense the touch input based on the output light and the received light.

As another example, if the user located in front of the screen 200 performs gesture input in front of the screen 200 using a hand, the light output module 600 may receive light scattered or reflected by the user hand and sense the gesture input based on the output light and the received light.

Consequently, in accordance with the display apparatus 30, touch input and gesture input may be recognized.

For this purpose, the light output module 600 may include a light source unit 210, a light collimating unit 212, a light combination unit 220, a light reflection unit 257, a light path conversion unit 258, a scanner 140, a processor 170, a light source driving unit 185, a light collimating unit 218, an infrared transmission filter 282, and a light detection unit 280.

The light source unit 210 may include a plurality of light source units. That is, the light source unit 210 may include a red light source unit 210R, a green light source unit 210G, a blue light source unit 210B, and an output light source unit 210IR to output infrared light. Thereamong, the light source units 210R, 210G and 210B may include laser diodes.

The respective light source units 210R, 210G, 210B and 210IR may be driven by respective electrical signals from the light source driving unit 185, the electrical signals of the light source driving unit 185 may be generated under the control of the processor 170. The output light source unit 210IR may output light based on an electrical signal corresponding to output light.

Light beams output from the respective light source units 210R, 210G, 210B and 210IR may be collimated through respective collimator lenses within the light collimating unit 212.

The light combination unit 220 may combine the light beams output from the respective light source units 210R, 210G, 210B and 210IR and then output the combined light in one direction. For this purpose, the light combination unit 220 may include four mirrors 220a, 220b, 220c and 220d.

That is, the first light combination unit 220a, the second light combination unit 220b, the third light combination unit 220c, and the fourth light combination unit 220d cause red light output from the red light source unit 210R, green light output from the green light source unit 210G, blue light output from the blue light source unit 210B, and output light output from the output light source unit 210IR to be output in the direction of the scanner 140.

The light reflection unit 257 reflects the red light, the green light, the blue light and the output light having passed through the light combination unit 210 in the direction of the scanner 140. The light reflection unit 257 reflects light of various wavelengths and may thus be implemented as a total mirror TM The scanner 140 may receive visible light (RGB) and output light (IR) from the light source unit 210 and sequentially and repeatedly perform scanning in the first direction and scanning in the second direction to the outside. Such scanning operation is repeatedly performed with respect to the entirety of an external scan area. Particularly, the scanner 140 may output visible light (RGB) and output light (IR) to the screen 200.

Thereby, a projected image corresponding to the visible light (RGB) may be displayed on the screen 200.

Further, the output light (IR) may be scattered and reflected by an external object located in front of the screen 200 and then be incident upon the light output module 100. Concretely, the received light may be input to the light detection unit 280 via the light collimating unit 218 and the infrared transmission filter 282.

The light detection unit 280 may convert the received light into an electrical signal, and the processor 170 may detect a distance to the external object based on the output light and the received light by a finger 20. If the external object is a user finger touching the screen 200, the processor 170 may perform processing of touch input.

As described above, in order to increase spatial resolution of the external object, the scanner 140 within the light output module 60 may vary a frame rate, vary scanning angles, or vary both the frame rate and the scanning angles. Particularly, in order to increase spatial resolution in user touch input, scanning zoom of a touched region may be performed by adjusting scanning angles.

In accordance with the embodiment of the present invention, since the scanner 140 outputs visible light, even if the screen 200 on which a projected image is displayed has a free-form surface, the projected image corresponding to the free-form surface of the screen 200 may be displayed. For example, the free-form surface state of the screen 200 may be recognized through distance detection using output light, scaling of a displayed image may be performed in response to the corresponding free-form surface, and the scaled projected may be displayed. Thereby, free-form surface display may be carried out.

Figure 10:
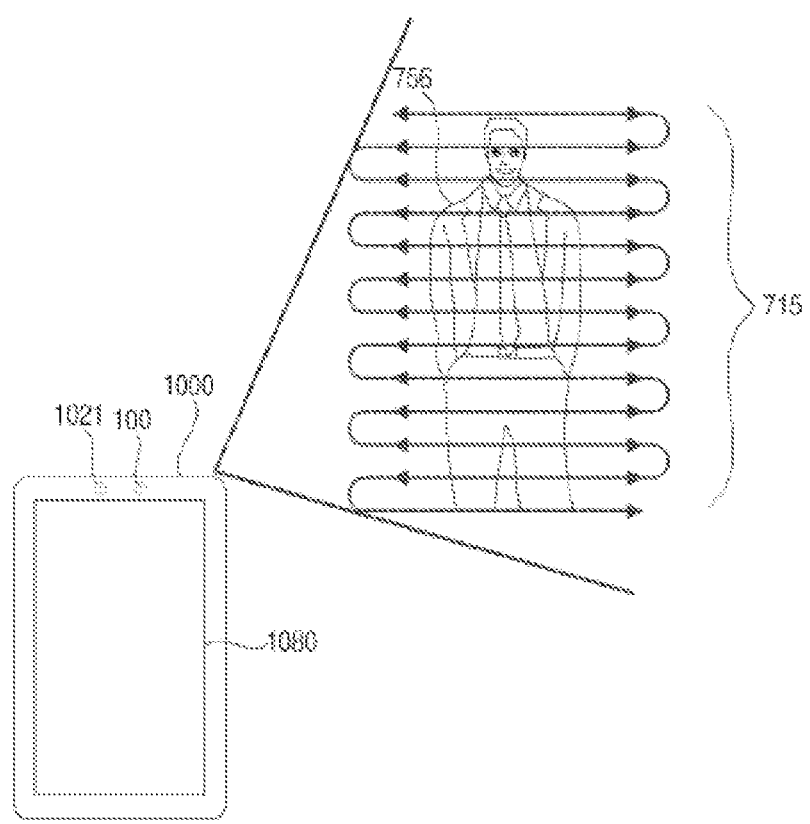
FIG. 10 is a view illustrating projection of light for distance detection in an image display apparatus including a distance detection unit in accordance with one embodiment of the present invention.

FIG. 10 is a view illustrating projection of light for distance detection in an image display apparatus including a distance detection unit in accordance with one embodiment of the present invention.

With reference to this figure, the image display apparatus 1000 may include a display 180, a distance detection unit 100, and a camera 1021.

Here, the distance detection unit 100 is the distance detection unit described with reference to FIGS. 1 to 8b, and may vary at least one of scanning angles and a frame rate.

This figure exemplarily illustrates the camera 1021 and the distance detection unit 100 as being located in the direction of the rear surface of the display 1080.

Further, similarly to in FIG. 6a, this figure exemplarily illustrates the scanner 140 as executing scanning at a first frame rate A, a first scanning angle X and a second scanning angle Y. Thereby, an external object 756 is scanned while light is output.

By user input or if movement of the external object 756 is sensed, the frame rate may be varied to A/2, as exemplarily shown in FIG. 6b, the scanning angles are decreased, as exemplarily shown in FIG. 8b, or both the frame rate and the scanning angles may be varied, as exemplarily shown in FIG. 8c.

Figure 11:
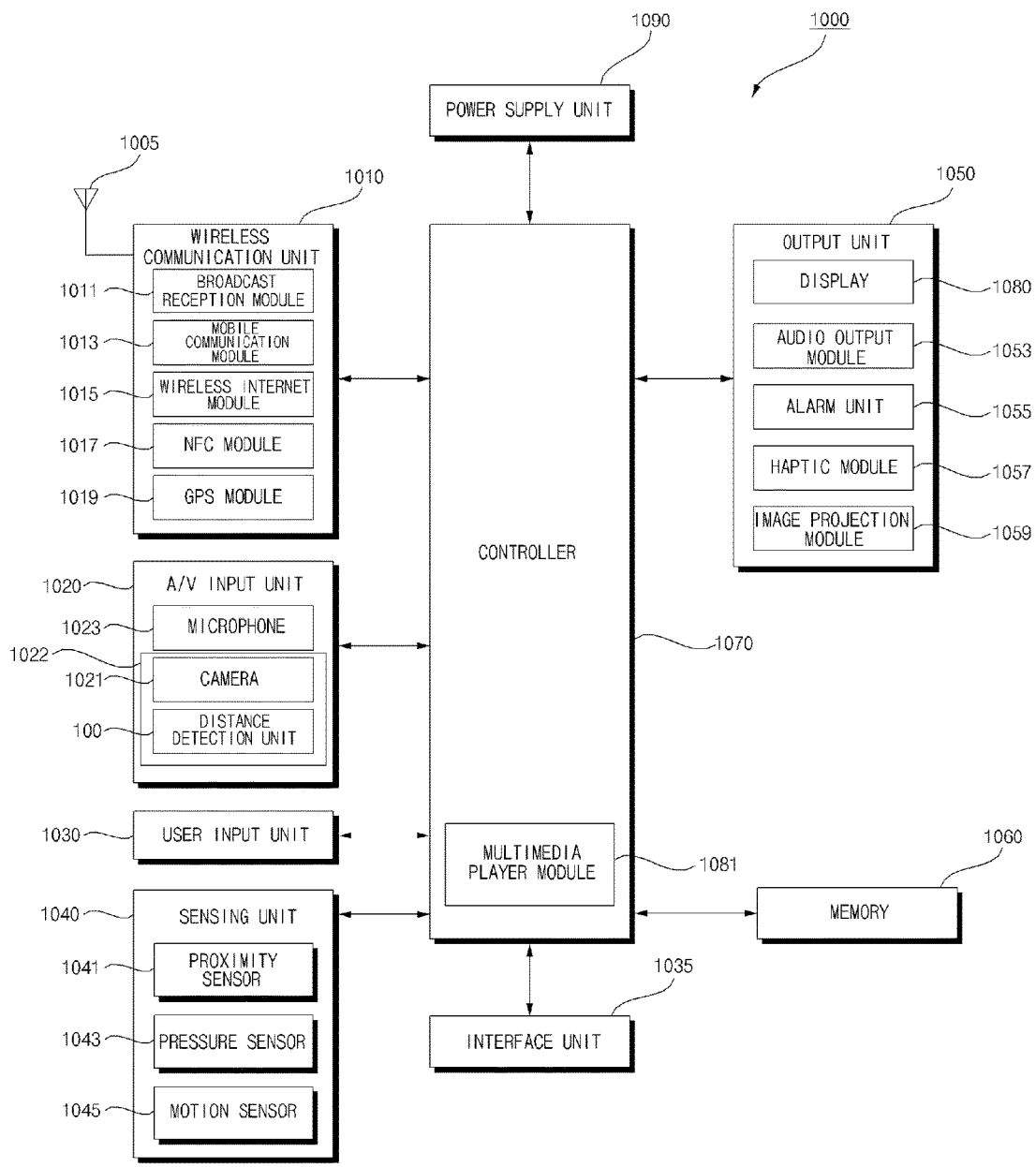
FIG. 11 is an inner block diagram of a mobile terminal which is one example of the image display apparatus of FIG. 10.

FIG. 11 is an inner block diagram of a mobile terminal which is one example of the image display apparatus of FIG. 10.

FIG. 11 is an inner block diagram of the mobile terminal of FIG. 1.

With reference to FIG. 11, the mobile terminal 1000 may include a wireless communication unit 1010, an audio/video (A/V) input unit 1020, a user input unit 1030, a sensing unit 1040, an output unit 1050, a memory 1060, an interface unit 1035, a controller 100, and a power supply unit 1090.

The wireless communication unit 1010 may include a broadcast reception module 1011, a mobile communication module 1013, a wireless Internet module 1015, an NFC module, and a GPS module 1019.

The broadcast reception module 1011 may receive at least one a broadcast signal and broadcast-related information from an external broadcast management server through broadcast channels. Here, the broadcast channels may include satellite channels, terrestrial channels, etc.

The broadcast signal and/or the broadcast-related information received through the broadcast reception module 1011 may be stored in the memory 1060.

The mobile communication module 1013 receives/transmits a wireless signal from/to at least one of a base station, an external terminal and a server in a mobile communication network. Here, wireless signals may include voice call signals, video call signals, or data of various formats according to reception/transmission of text/multimedia messages.

The wireless Internet module 1015 refers to a module for wireless Internet connection. The wireless Internet module 1015 may be installed inside or outside the mobile terminal 100.

The NFC module 1017 may perform near field communication. If the NFC module 1017 approaches an NFC apparatus (not shown) within a designated distance, i.e., performs tagging, the NFC module 1017 may receive designated data from the NFC apparatus.

The GPS (Global Positioning System) module 1019 may receive position information from a plurality of satellites.

The A/N input unit 1020 serves to input an audio signal or a video signal and may include a camera 1021, a distance detection unit 100, a microphone 1023, etc.

The distance detection unit 100 in accordance with the embodiment of the present invention may be the small-sizes distance detection apparatus shown in FIG. 1. Particularly, the distance detection unit 100 may vary scanning angles and a frame rate and execute distance detection based on such variations of the scanning angles and the frame rate. The distance detection unit 100 has been described above with reference to FIGS. 1 to 9 and a detailed description thereof will thus be omitted.

The distance detection unit 100 and the camera 1021 may be provided within a 3D camera 1022.

Calculated distance information may be transmitted to the controller 1070 and thus be used in reproduction of multimedia, particularly, display of a 3D image, or transmitted to the outside.

The user input unit 1030 generates key input data which a user inputs to control operation of the terminal. For this purpose, the user input unit 1030 may include at least one of a keypad, a dome switch, or a touch sensor unit (static pressure/electrostatic) 1270 (in FIG. 13). Particularly, if the touch sensor unit 1270 forms a layered structure with the display 1080, which will be described later, such a layered structure may be referred to as a touchscreen.

The sensing unit 1040 may sense the current state of the mobile terminal 1000, such as the opening and closing state of the mobile terminal 1000, the position of the mobile terminal 100, whether or not a user contacts the mobile terminal 1000, etc., and generates a sensing signal to control operation of the mobile terminal 1000.

The sensing unit 1040 may include a proximity sensor 1041, a pressure sensor 1043, a motion sensor 1045, etc. The motion sensor 1045 may sense the movement or position of the mobile terminal 1000 using an acceleration sensor, a gyro sensor, a gravity sensor, etc. Particularly, the gyro sensor is a sensor to measure angular velocity and may sense a direction (an angle) rotated from a reference direction.

The output unit 1050 may include a display 1080, an audio output module 1053, an alarm unit 1055, a haptic module 1057, etc.

The display 1080 displays information processed by the mobile terminal 1000.

If the display 1080 and a touch pad form a layered structure to constitute a touchscreen, as described above, the display 1080 may be used as an input device, which may input information by user touch, as well as an output device.

The audio output module 1053 outputs audio data received from the wireless communication unit 1010 or stored in the memory 1060. The audio output module 1053 may include a speaker, a buzzer, etc.

The alarm unit 1055 outputs a signal informing of generation of an event of the mobile terminal 1000. For example, the alarm unit 1055 may output a signal as vibration.

The haptic module 1057 generates various tactile effects which a user may feel. As one representative example of tactile effects generated by the haptic module 1057, there is a vibration effect.

The memory 1060 may store programs to execute processing and control of the controller 1070 and perform a function of temporarily storing input or output data (for example, a phonebook, a message, a still image, a moving picture, etc.).

The interface unit 1035 serves as an interface with all external apparatuses connected to the mobile terminal 100. The interface unit 1035 may receive data or power from these external apparatuses and transmit the received data or power to the respective elements of the mobile terminal 1000, and transmit data within the mobile terminal 1000 to external apparatuses.

The controller 1070 may generally control the overall operation of the mobile terminal 1000 by controlling the operations of the respective elements. As one example, the controller 1070 may perform control and processing regarding voice call, data communication, video call, etc. Further, the controller 1070 may include a multimedia player module 1081 to reproduce multimedia. The multimedia player module 1081 may be configured as hardware within the controller 1070 or configured as software separately from the controller 1070.

The power supply unit 1090 receives external power and internal power under the control of the controller 1070 and supplies power necessary to operate the respective elements.

The mobile terminal 1000 having the above-described configuration may include a wired/wireless communication system and a satellite-based communication system and be configured to be operated in a communication system which may transmit data through frames or packets.

FIG. 11 is a block diagram of the mobile terminal 1000 in accordance with one embodiment of the present invention. The respective elements of the block diagram may be unified, added or omitted according to specifications of the mobile terminal 1000 as substantially implemented. That is, as needed, two or more elements may be unified into one element, or one element may be segmented into two or more elements. Further, functions performed by respective blocks are only to describe the embodiment of the present invention and detailed operations or devices thereof do not limit the scope of the present invention.

Figure 12:
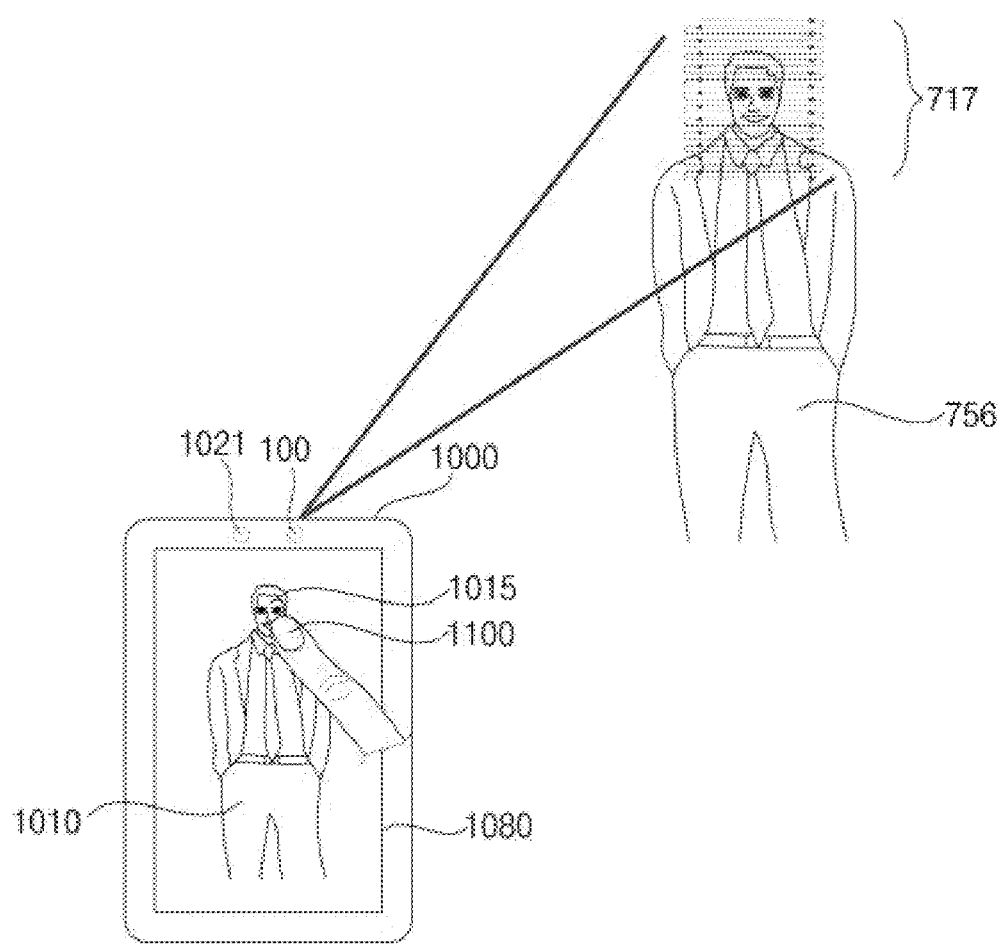
FIGS. 12 and 13 are reference views illustrating various operations of the image display apparatus of FIG. 10.
Figure 13:
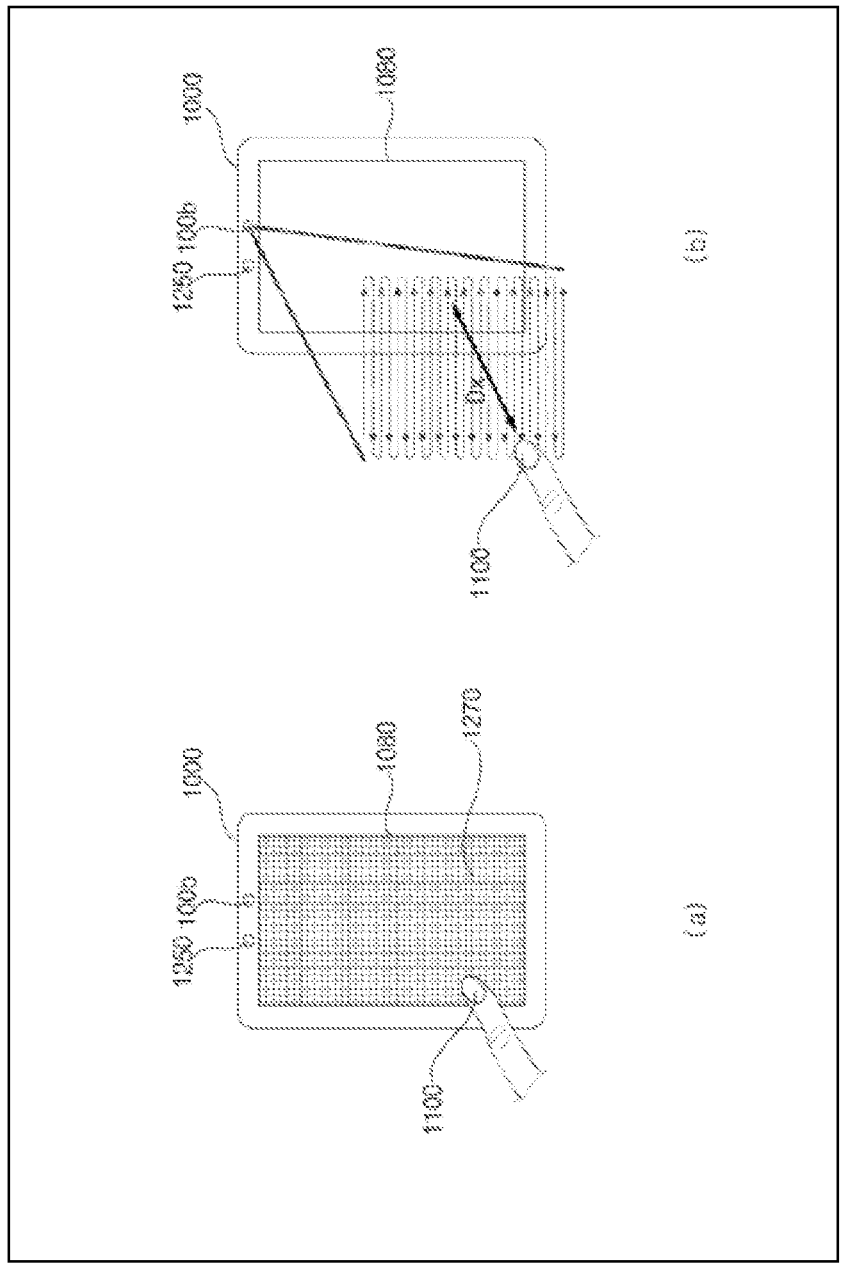

FIGS. 12 and 13 are reference views illustrating various operations of the image display apparatus of FIG. 10.

First, FIG. 12 exemplarily illustrates that, under the display state of an image 1010, captured by the camera 1021, if selection input of selecting a specific region 1015 in the image 1010 is received from a user, scanning zoom corresponding to the selected region 1015 is performed.

That is, when the user touches a face region 1015 in the image 1010 of an external object 756 using a finger 1100, the controller 1070 may perform scanning zoom of the selected region.

That is, the controller 1070 may control the distance detection unit 100 to vary scanning angles.

With reference to this figure, the first scanning angle and the second scanning angle of the scanner 140 may be respectively decreased to X/10 and Y/10, as compared to FIG. 10. Here, the frame rate A may be maintained.

In this case, a scan area 717 during scanning is reduced to 1/100 that of FIG. 10. Thereby, only a part 717 of the overall scan area 715 may be scanned.

Further, the controller 1070 may vary a frame rate instead of the scanning angles, or vary both the scanning angles and the frame rate.

As one example, when the specific region 1015 in the image 1010 is selected, the controller 1070 may perform control to display an object (not shown) for adjusting the scanning angles and an object (not shown) for adjusting the frame rate. In this case, at least one of the scanning angles and the frame rate may be adjusted according to user selection.

FIG. 13 exemplarily illustrates the image display apparatus 1000 in which a front camera 1240 and a distance detection unit 100b are disposed at the upper portion of the display 1080.

The image display apparatus 1000 may include a touch sensor unit 1270 disposed on the display 1080 and, if a user finger 1100 touches the display 1080, sense touch input through the touch sensor unit 1270.

If the user finger 1100 is separated from the touch sensor unit 1270, the distance detection unit 100b may be activated and thus operated. This figure exemplarily illustrates the user finger 1100 as being separated from the touch sensor unit 1270 by a distance of Dx.

In this case, the controller 1070 may control the scanner of the distance detection unit 100b to perform scanning, as described with reference to FIGS. 1 to 8b.

Thereby, the controller 1070 may process gesture input by the finger 1100.

A distance detection apparatus in accordance with the present invention is not limited to configurations and methods of the above-described embodiments, and all or some of the embodiments may be selectively combined so as to be variously modified.

Further, although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention is applicable to a distance detection apparatus and an image display apparatus having the same and, particularly, to a distance detection apparatus for acquiring distance information having variable spatial resolution and an image display apparatus having the same.

The invention claimed is:

1. A distance detection apparatus comprising:
a light source configured to output light to detect a distance to an external object;
a scanner configured to perform scanning in a first direction and scanning in a second direction and to output the output light to an external scan area;
a light detector configured to receive light from the scan area;
a processor configured to detect the distance to the external object within the external scan area based on the output light and the received light;
a sampler configured to sample an electrical signal output from the light detector,
wherein the processor:
performs control to vary a frame rate of the scanner; and
acquires distance information having varied spatial resolution of the external object according to variation of the frame rate of the scanner,
wherein, in order to acquire the distance information having varied spatial resolution of the external object, the processor performs control to vary a sampling rate of the sampler.

2. The distance detection apparatus according to claim 1, wherein the processor performs control to maintain scanning angles of the scanner when the frame rate of the scanner is varied.

3. The distance detection apparatus according to claim 1, wherein the processor decreases the frame rate of the scanner to acquire distance information having increased spatial resolution of the external object.

4. The distance detection apparatus according to claim 1, wherein, in order to acquire the distance information having varied spatial resolution of the external object, the processor further performs control to vary scanning angles of the scanner.

5. The distance detection apparatus according to claim 1, further comprising:
an amplifier configured to amplify the electrical signal output from the light detector; and
a filter configured to execute filtering of the amplified signal, wherein:
the sampler executes sampling of the filtered signal; and
in order to acquire the distance information having varied spatial resolution of the external object, the processor further performs control to vary a bandwidth of the filter.

6. A distance detection apparatus comprising:
a light source configured to output light to detect a distance to an external object;
a scanner configured to perform scanning in a first direction and scanning in a second direction and to output the output light to an external scan area;
a detector configured to receive light from the scan area;
a processor configured to detect the distance to the external object within the external scan area based on the output light and the received light;
an amplifier configured to amplify an electrical signal output from the light detector;
a filter configured to execute filtering of the amplified signal; and
a sampler configured to execute sampling of the filtered signal,
wherein the processor:
performs control to vary scanning angles of the scanner; and
acquires distance information having varied spatial resolution of the external object according to variation of the scanning angles of the scanner.

7. The distance detection apparatus according to claim 6, wherein the processor performs control to maintain a frame rate of the scanner when the scanning angles of the scanner are varied.

8. The distance detection apparatus according to claim 6, wherein the processor decreases at least one of an angle of the scanner in the first direction and an angle of the scanner in the second direction to acquire distance information having increased spatial resolution of the external object per unit area.

9. An image display apparatus comprising:
a display; and
a distance detector, wherein the distance detector includes:
  a light source configured to output light to detect a distance to an external object;
  a scanner configured to perform scanning in a first direction and scanning in a second direction and to output the output light to an external scan area;
  a light detector configured to receive light from the scan area; and
  a processor configured to detect the distance to the external object within the external scan area based on the output light and the received light,
  wherein the processor:
    performs control to vary at least one of a frame rate and scanning angles of the scanner; and
    acquires distance information having varied spatial resolution of the external object according to variation of the at least one of the frame rate and the scanning angle,
    wherein the distance detector further includes a sampler configured to sample an electrical signal output from the light detector,
    wherein a processor performs control to vary a sampling rate of the sampler according to variation of the frame rate.

10. The image display apparatus according to claim 9, further comprising a controller configured to perform control to vary at least one of the frame rate and the scanning angles of the scanner of the distance detector according to user input.

11. The image display apparatus according to claim 9, further comprising:
a camera; and
a controller configured to perform control to display an image captured by the camera on the display,
wherein the controller, if a specific region in the image is selected, performs control to vary the scanning angles of the distance detector according to the specific region.

12. The image display apparatus according to claim 11, further comprising a touch sensor configured to sense user touch input,
wherein the controller, if the specific region is selected by the user touch input, performs control to vary the scanning angles of the distance detector according to the specific region.

13. The image display apparatus according to claim 9, further comprising a touch sensor configured to sense user touch input,
wherein a controller controls the touch sensor to sense the touch input and, if a user finger is separated from the touch sensor, activates the distance detector to detect a distance to the user finger.

14. The image display apparatus according to claim 9, wherein the distance detector further includes:
an amplifier configured to amplify the electrical signal output from the light detector; and
a filter configured to execute filtering of the amplified signal, wherein:
  the sampler executes sampling of the filtered signal; and
  in order to acquire the distance information having varied spatial resolution of the external object, the processor further performs control to vary a bandwidth of the filter.

15. The image display apparatus according to claim 9, wherein the distance detector further includes:
an amplifier configured to amplify an electrical signal output from the light detector according to variation of the scanning angles;
a filter configured to execute filtering of the amplified signal; and
a sampler configured to execute sampling of the filtered signal.

* * * * *